May 17, 1955 W. B. MAIS 2,708,380
BODY AND FENDER REPAIRING DEVICE
Filed Sept. 12, 1952 2 Sheets-Sheet 1
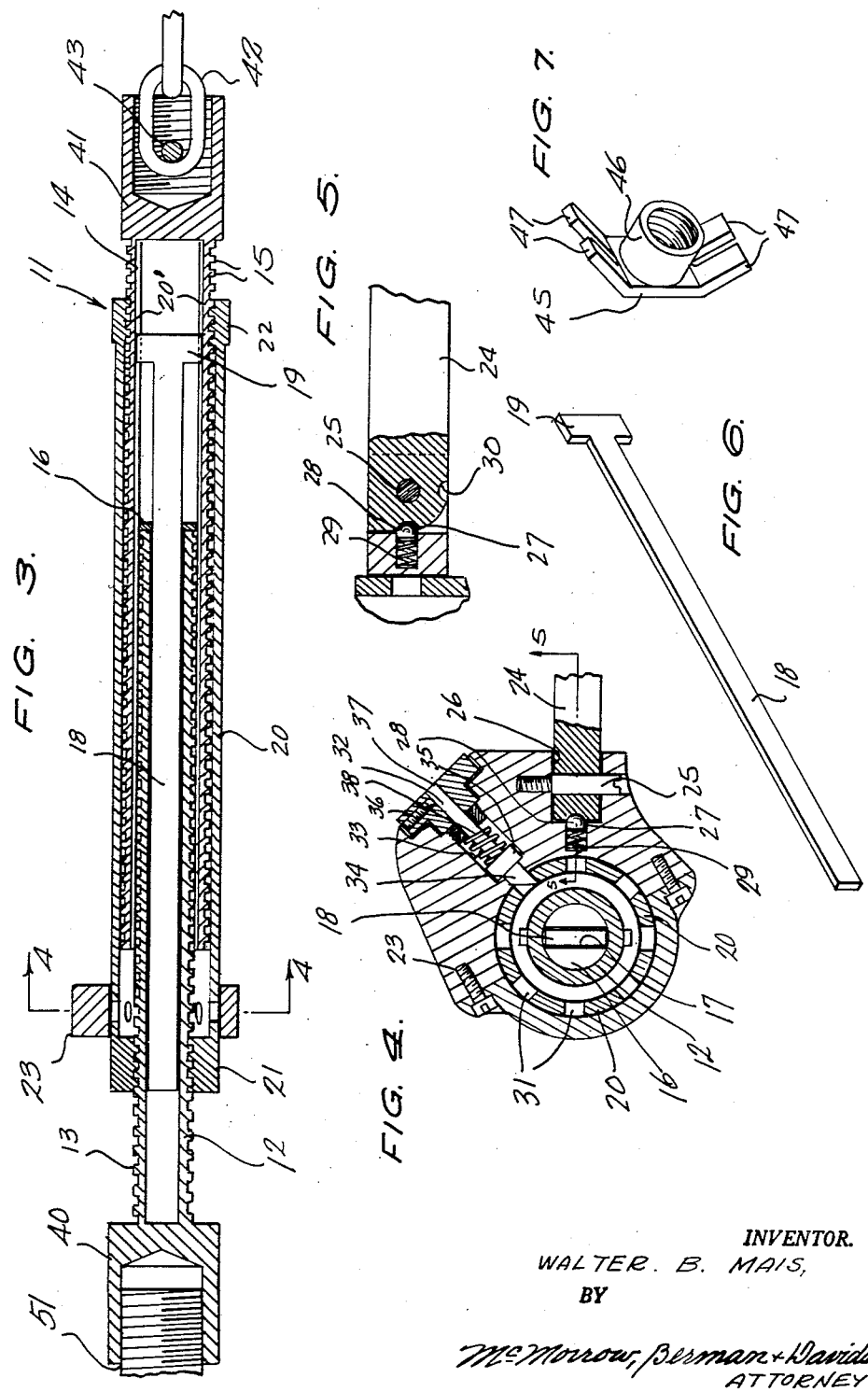
INVENTOR.
WALTER B. MAIS,
BY
McMorrow, Berman + Davidson
ATTORNEYS.

May 17, 1955  W. B. MAIS  2,708,380
BODY AND FENDER REPAIRING DEVICE
Filed Sept. 12, 1952  2 Sheets-Sheet 2

INVENTOR.
WALTER B. MAIS,
BY
Morrow, Berman & Davidson
ATTORNEYS.

United States Patent Office 2,708,380
Patented May 17, 1955

2,708,380

BODY AND FENDER REPAIRING DEVICE

Walter B. Mais, Wausau, Wis.

Application September 12, 1952, Serial No. 309,311

2 Claims. (Cl. 81—15)

This invention relates to pushing and pulling implements, and more particularly to an improved jack device for use in repairing and straightening automobile bodies and fenders.

A main object of the invention is to provide a novel and improved jack device for use in automobile body repair work, the improved jack device being simple in construction, being easy to operate, and being extremely versatile so that it may be employed for performing a wide variety of different types of body straightening operations.

A further object of the invention is to provide an improved jack device for use in body and fender repair work, the improved jack device involving inexpensive components, being sturdy in construction, being extensible as required for straightening various portions of an automobile body, being suitable either for use in pulling operations or pushing operations, and providing a substantial saving in time and labor in automobile body repair work.

Further objects and advantages of the invention will become apparent from the following description and claims, and from the accompanying drawings, wherein:

Figure 3 is an enlarged longitudinal cross sectional view taken through the jack device on the line 3—3 of Figure 2.

Figure 4 is an enlarged transverse vertical cross sectional view taken on the line 4—4 of Figure 3.

Figure 5 is an enlarged cross sectional detail view taken on the line 5—5 of Figure 4.

Figure 6 is an enlarged perspective view of the key element employed to lock the inner telescoping elements of the jack device against relative rotation.

Figure 7 is a perspective view of a detachable foot member which may be employed on the end of one of the extension arms of the jack device of the present invention, as illustrated in Figure 1.

Figure 2:
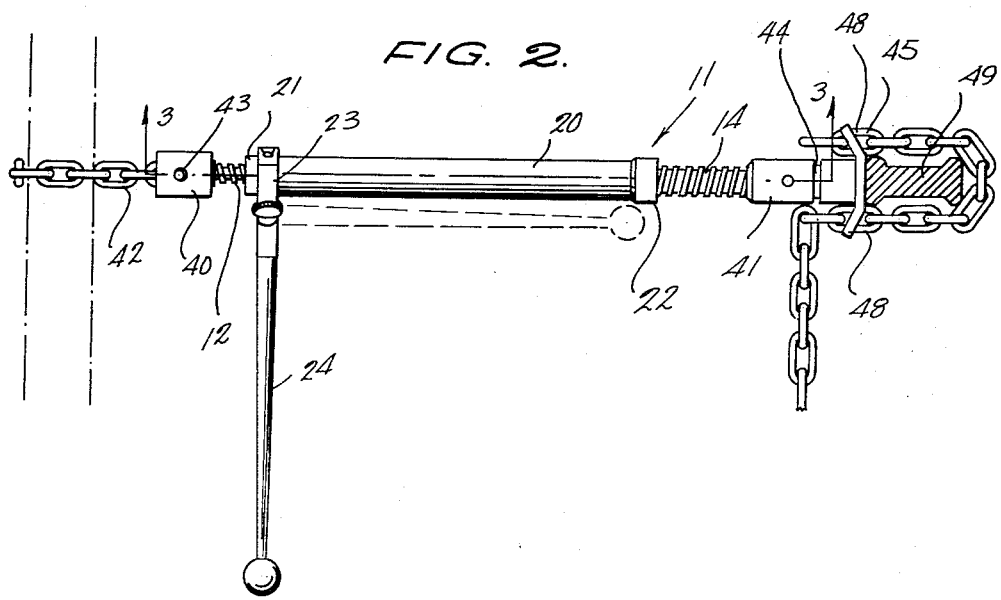
Figure 2 is an enlarged elevational view of the main portion of the improved car body straightening device employed in Figure 1.

Referring to the drawings, and more particularly to Figures 2 and 3, the jack device, forming the main component of the improved body straightening implement of the present invention is designated generally at 11. The device 11 comprises a first sleeve member 12 formed with the external, square threads 13 and a second sleeve member 14 which telescopically receives the first sleeve member 12. The sleeve member 14 is formed with the external square threads 15. Secured to the inner end of the first sleeve member 12 is the washer 16, said washer being formed with a diametrically extending slot 17, shown in Figure 4. Slidably extending through said slot is the longitudinal bar 18, said bar being formed with the enlarged head 19 at its outer end which slidably engages in diametrically opposed grooves 20', 20' formed internally in the second sleeve member 14, whereby the first sleeve member 12 is restrained against rotation relative to the second sleeve member 14 but may move slidably therein.

Designated at 20 is a third sleeve member which surrounds the second sleeve member 14 and which is provided at its ends with the internally threaded collar portions 21 and 22 threadedly engaging the respective threads 13 and 15. The threads 13 and 15 are oppositely directed, the internal threads on the collar elements 21 and 22 being similarly oppositely directed, whereby rotation of the third sleeve member 20 in one direction causes the sleeve members 12 and 14 to be extended from the third sleeve member 20, and rotation of the third sleeve member 20 in the opposite direction causes the sleeve members 12 and 14 to be drawn inwardly into said third sleeve member 20.

Rotatably mounted on the third sleeve member 20 adjacent one end thereof is the collar assembly 23. Designated at 24 is an elongated handle member which is pivoted to the collar assembly 23, as by a pivot pin 25, for rotation from a position parallel to the third sleeve member 20, shown in dotted view in Figure 2, to a position extending radially outwardly from said third sleeve member, as shown in full line view in Figure 2. As is clearly shown in Figure 4, the end of the handle 24 is rotatably received in a recess 26 formed in the collar 23, the pin 25 extending transversely through said recess and through the end of the handle 24, the handle 24 being formed at its extremity with a locking recess 27 in which a spring-pressed ball 28 is engageable, as shown in Figure 4. The spring-pressed ball 28 is positioned in a recess 29 formed in the collar 23 and is arranged to engage in the recess 27 to releasably lock the handle 24 in the outwardly extending position thereof shown in Figure 2. As is clearly shown in Figure 5, the handle 24 is formed with an additional detent recess 30 spaced at a 90° angle separation from the recess 27, relative to the pivot pin 25, whereby the spring-pressed ball 28 may lockingly engage in the recess 30 and releasably secure the handle 24 in the dotted line position thereof shown in Figure 2, namely, in a position extending substantially parallel to the third sleeve member 20.

The third sleeve member 20 is formed with the circumferentially spaced apertures 31 beneath the collar 23, the apertures 31 being uniformly spaced, as shown in Figure 4. Designated at 32 is a ratchet plunger which is housed in a radially extending bore 33 formed in the collar 23, the plunger having a beveled tip 34 which is lockingly engageable with the apertures 31 to limit rotation of the collar relative to the sleeve member 20 to one direction.

As shown in Figure 4, the plunger 32 comprises an enlarged flange 35 which is slidable in the bore 33, and the main portion of the plunger is rigidly secured to the flange 35 and extends axially through the bore 33, as illustrated. Encircling the stem of the plunger is the coiled spring 36 which engages between the flange 35 and a bushing 37 threadedly engaged in the bore 33, as shown. Secured to the end of the plunger 32 is the knob 38 which may be pulled outwardly manually when it is desired to disengage the beveled tip 34 of the ratchet plunger from locking engagement in one of the apertures 31. As viewed in Figure 4, the sleeve 20 may be rotated clockwise relative to the beveled ratchet element 34, but counterclockwise rotation of said sleeve relative to the ratchet element 34 is prevented. Thus, the collar 23 may be rotated clockwise with the sleeve 20 by rotating the handle 24 clockwise, as viewed in Figure 4. The sleeve 20 may thus be rotated clockwise relative to the sleeves 12 and 14. This acts to extend the sleeves 12 and 14 outwardly relative to the third sleeve member 20. To reverse the movement of the sleeve members 12 and 14, namely, to cause the sleeve members 12 and 14 to move inwardly relative to the third sleeve member 20, the plunger rod 32 is pulled outwardly and rotated 180°, to reverse the position of the beveled tip 34, whereby the sleeve member 20 may be rotated counterclockwise, as viewed in Figure 4, by rotating the handle 24 counterclockwise. Thus, the knob 38, which is normally housed in the collar 23, may be pulled outwardly whenever it is desired to reverse the position of the beveled tip 34, whereby the jack device may be converted from a pushing implement to a pulling implement, or vice versa.

Rigidly secured on the end of the sleeve member 12 is the internally threaded socket member 40, and rigidly secured on the end of the sleeve member 14 is the internally threaded socket member 41. The socket 41 may receive the end of a chain 42 and be connected thereto, as by a removable transverse pin 43 extending through the socket 41, as shown in Figure 3. Similarly, a chain may be connected to the socket 40 in the same manner, namely, by the use of a transverse pin 43 extending through the end link of the chain received in the socket 40, as shown for example in Figure 2. When the implement is to be employed for a pulling operation, a chain 42 may be connected to the socket 40, as shown in Figure 2, and a rod member 44 may be threadedly secured in the socket 41. Threaded on the end of the rod 44 is the chain-engaging member 45, shown in Figure 7, the chain-engaging member 45 comprising a socket 46 adapted to be threadedly engaged on the end of a rod 44. The member 45 includes a generally T-shaped head having the inclined pairs of spaced fingers 47, 47, the fingers 47, 47 being adapted to lockingly engage links 48 of a pulling chain in the manner shown in Figure 2 to secure said chain around a member 49 to be pulled, as illustrated.

Figure 1:
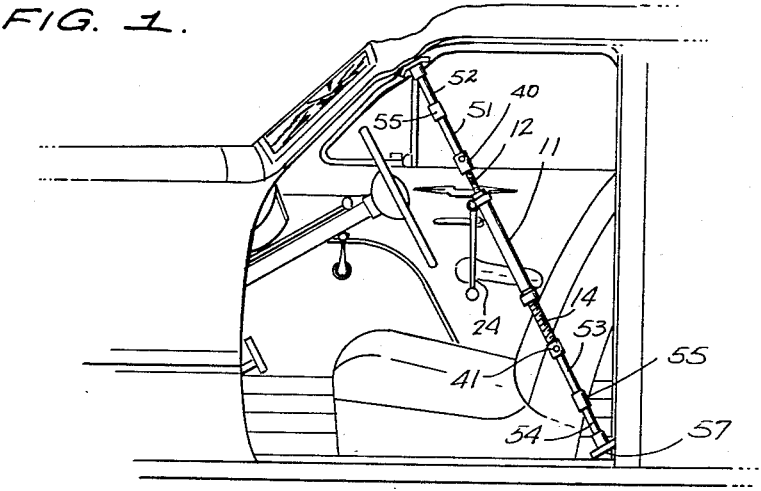
Figure 1 is a fragmentary side elevational view of a portion of an automobile body showing the manner in which an improved jack device according to the present invention may be employed for straightening a portion of the roof of the body.

The member 45 may also be employed as an abutment element in a pushing operation, the device being arranged for example, as illustrated in Figure 1. As shown in Figure 1, the main portion 11 of the device has coupled thereto the extension rods 51, 52, 53 and 54 to provide the necessary length, so that the device may be effectively employed to straighten the roof portion of the car relative to the floor portion thereof, in the specific example illustrated in Figure 1, the rod 51 being connected to the rod 52 by a conventional pipe coupling 55 and the extension rod 53 being connected to the extension rod 54 by a similar pipe coupling. The abutment member 45 is threaded on the end of the rod element 52, and a similar abutment element, shown at 57, may be engaged on the end of the extension rod 54. Obviously, extension rods of any desired length may be employed in conjunction with the jack device 11, whereby the desired pushing operation may be accomplished.

While a specific embodiment of an improved implement for use in automobile body and fender repair work has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In an automobile body and fender repair device of the character described, a first sleeve member having a socket on one end thereof, a second sleeve member having the portion adjacent one end telescopically receiving the portion of said first sleeve member inwardly of the other end thereof, said second sleeve member having a socket on the other end thereof, said sleeve members being formed with oppositely directed external threads, means keying said sleeve members against relative rotation, a third sleeve member surrounding said first and second sleeve members, and respective nut elements fixedly secured on said third sleeve member threadedly engaged with the external threads of the first and second sleeve members, said keying means comprising a plate member secured to the inner end of said second sleeve member and having a rectangular opening therein, a pair of oppositely disposed keyways formed in said first sleeve member, and a rectangular bar member slidably engaged in said opening in said plate member, said last named member having an enlarged head engaged in said oppositely disposed keyways.

2. In an automobile body and fender repair device of the character described, a first sleeve member having a socket on one end thereof, a second sleeve member having the portion adjacent one end telescopically receiving the portion of said first sleeve member inwardly of the other end thereof, said second sleeve member having a socket on the other end thereof, said sleeve members being formed with oppositely directed external threads, means keying said sleeve members against relative rotation, a third sleeve member surrounding said first and second sleeve members, respective nut elements fixedly secured on said third sleeve member threadedly engaged with the external threads of the first and second sleeve members, a collar on said third sleeve member, interengaging ratchet means on said collar and third sleeve member locking said collar relative to said third sleeve member for one direction of rotation of said collar, and a handle secured to said collar, said keying means comprising a plate member secured to the inner end of said second sleeve member and having a rectangular opening therein, a pair of oppositely disposed keyways formed in said first sleeve member, and a rectangular bar member slidably engaged in said opening in said plate member, said last named member having an enlarged head engaged in said oppositely disposed keyways.

References Cited in the file of this patent

UNITED STATES PATENTS

| | | |
|---|---|---|
| 531,785 | Didier | Jan. 1, 1895 |
| 716,337 | Hampton | Dec. 16, 1902 |
| 786,310 | Patterson | Apr. 4, 1905 |
| 1,435,452 | Couture | Nov. 14, 1922 |
| 1,546,472 | Butta | July 21, 1925 |
| 2,010,713 | Countryman | Aug. 6, 1935 |
| 2,185,550 | Gerdes | Jan. 2, 1940 |